J. SACHS

July 11, 1933. AUTOMATIC CIRCUIT BREAKER Re. 18,894

Original Filed April 10, 1930 5 Sheets-Sheet 1

Inventor
Joseph Sachs
By S. Jay Teller
Attorney

J. SACHS

July 11, 1933. AUTOMATIC CIRCUIT BREAKER Re. 18,894

Original Filed April 10, 1930 5 Sheets-Sheet 2

Inventor
Joseph Sachs
By S. Jay Teller
Attorney

J. SACHS

July 11, 1933. AUTOMATIC CIRCUIT BREAKER Re. 18,894

Original Filed April 10, 1930 5 Sheets-Sheet 3

Inventor: Joseph Sachs

By S. Jay Teller

Attorney

J. SACHS

July 11, 1933. AUTOMATIC CIRCUIT BREAKER Re. 18,894

Original Filed April 10, 1930 5 Sheets-Sheet 4

Inventor
Joseph Sachs
By S. Jay Teller
Attorney

J. SACHS

July 11, 1933. AUTOMATIC CIRCUIT BREAKER Re. 18,894

Original Filed April 10, 1930 5 Sheets-Sheet 5

Inventor
Joseph Sachs
By S. Jay Teller
Attorney

Reissued July 11, 1933 Re. 18,894

UNITED STATES PATENT OFFICE

JOSEPH SACHS, OF WEST HARTFORD, CONNECTICUT

AUTOMATIC CIRCUIT BREAKER

Original No. 1,840,978, dated January 12, 1932, Serial No. 443,067, filed April 10, 1930. Application for reissue filed April 27, 1933. Serial No. 668,234.

This invention relates particularly to circuit breakers of the general type disclosed in my patents for Automatic circuit breakers, No. 1,812,842, No. 1,811,970 and No. 1,812,843 all dated June 30, 1931.

One of the objects of the present invention is to provide in a circuit breaker of the type described an improved construction whereby adjustment, repair or replacement of parts may be very easily accomplished. To this end the contact member and the parts immediately associated therewith are so constructed and connected as to constitute a self-contained electro-responsive circuit controlling structure which is readily detachable from the supporting and operating parts of the circuit breaker.

A further object of the invention is to provide, for a circuit breaker of the type described, simple and inexpensive, but nevertheless effective, means for minimizing arcing.

A further object of the invention is to provide a circuit breaker of the type described having a plurality of independently operable circuit opening mechanisms connected and arranged for operation by a single operating means.

A still further object of the invention is to provide a circuit breaker, particularly a circuit breaker of the type described, having a plurality of independently operable circuit opening mechanisms so connected and interrelated with each other and with an operating means that the electro-responsive operation of one of them serves automatically to enable each remaining mechanism and also the operating means to immediately move to their open-circuit positions.

Other objects of the invention will be apparent from the following specification and claims.

In the accompanying drawings I have shown one embodiment of the invention, but it will be understood that the drawings are for illustrative purposes only and are not to be construed as defining or limiting the scope of the invention, the claims forming a part of this specification being relied upon for that purpose.

The appliance as shown has two circuit breaker mechanisms adapted to be included in different legs of a circuit and arranged for operation by a single operating means or handle. As concerns some of the features of the invention it is immaterial whether a plurality of circuit breaker mechanisms be provided or only one; but as concerns other features of the invention the provision of two or more circuit breaker mechanisms under the control of a single operating means is essential. The circuit breaker appliance is shown as enclosed in a cabinet and having testing means and other features adapting it for meter service. It will be understood, however, that as concerns certain features of my invention the cabinet and the meter service facilities are not essential and that the circuit breaker mechanism may be used entirely independently of these features.

Figure 1:
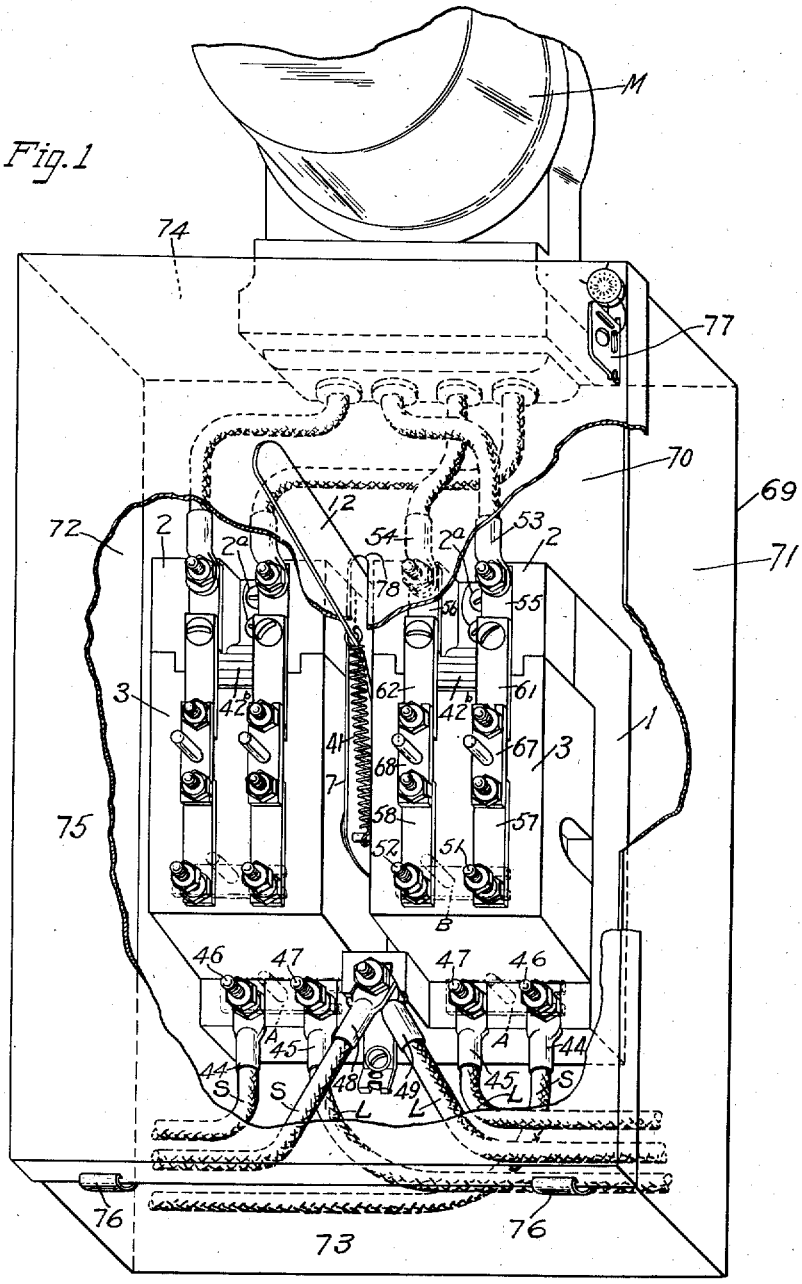
Fig. 1 is a perspective view of a circuit breaker appliance embodying the invention, the said circuit breaker being adapted for use in association with a meter and being enclosed in a cabinet.
Figure 2:
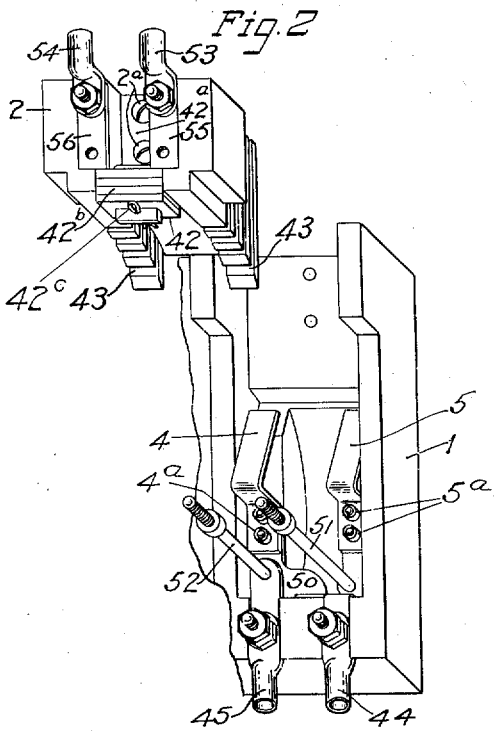
Fig. 2 is a fragmentary perspective view of certain parts of the appliance shown separately from other parts.

As shown in Figs. 1 and 2 there is provided a main insulating base 1 on which all of the parts of the appliance are mounted. Carried by the base adjacent each circuit breaker mechanism is a block 2 which is preferably formed separately from the base, although it may be integral therewith if desired. The blocks 2, 2 are held in place by means of screws $2^a$, $2^a$ engaging nuts $2^b$, $2^b$ in holes in the base 1. Removable cover means for the circuit breaker mechanisms is provided and this may be a single integral cover. I prefer however and have shown a separate removable cover 3 for each mechanism. Each cover 3 cooperates with the base 1 and the corresponding block 2 to substantially entirely close the corresponding circuit breaker mechanism. The two covers at the left and right are preferably interchangeable, although this is not essential.

Carried by the base 1 at each side thereof are two stationary electric contacts 4 and 5, these being spaced apart transversely and adapted to be engaged by movable contacts of the corresponding circuit breaker mechanism to be presently described. Each of the contacts 4 and 5 comprises a flat strip of metal bent as shown and having the contact face thereof located in a transverse plane. The contacts are easily removable, being held in place by means of nuts on screws $4^a$ and $5^a$.

Figure 4:
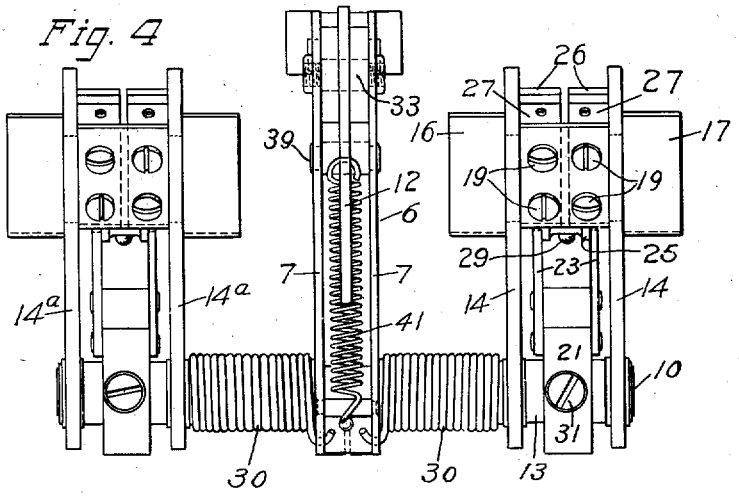
Fig. 4 is an enlarged front view of the movable parts of the circuit breaker and of the supporting standard therefor.
Figure 5:
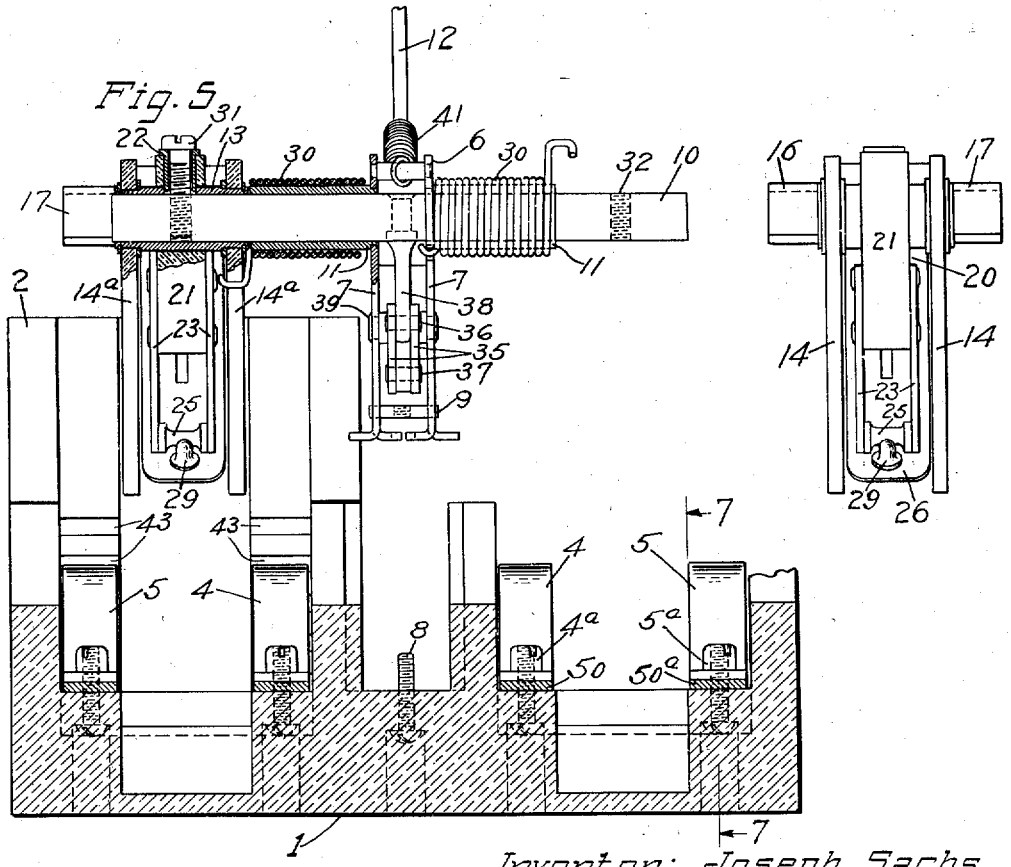
Fig. 5 is a bottom view of the parts shown in Fig. 4, these parts being separated from the base which is shown in section along the line 5—5 of Fig. 7.

Referring particularly to Figs. 4 and 5, there is provided a standard 6 which carries all of the movable parts of the appliance. This standard 6 comprises two side plates 7, 7, which are held in spaced relationship to each other. The standard may be secured in place on the base 1 by means of screws 8 extending forward into cross members 9 forming parts of the standard 6.

Figure 6:
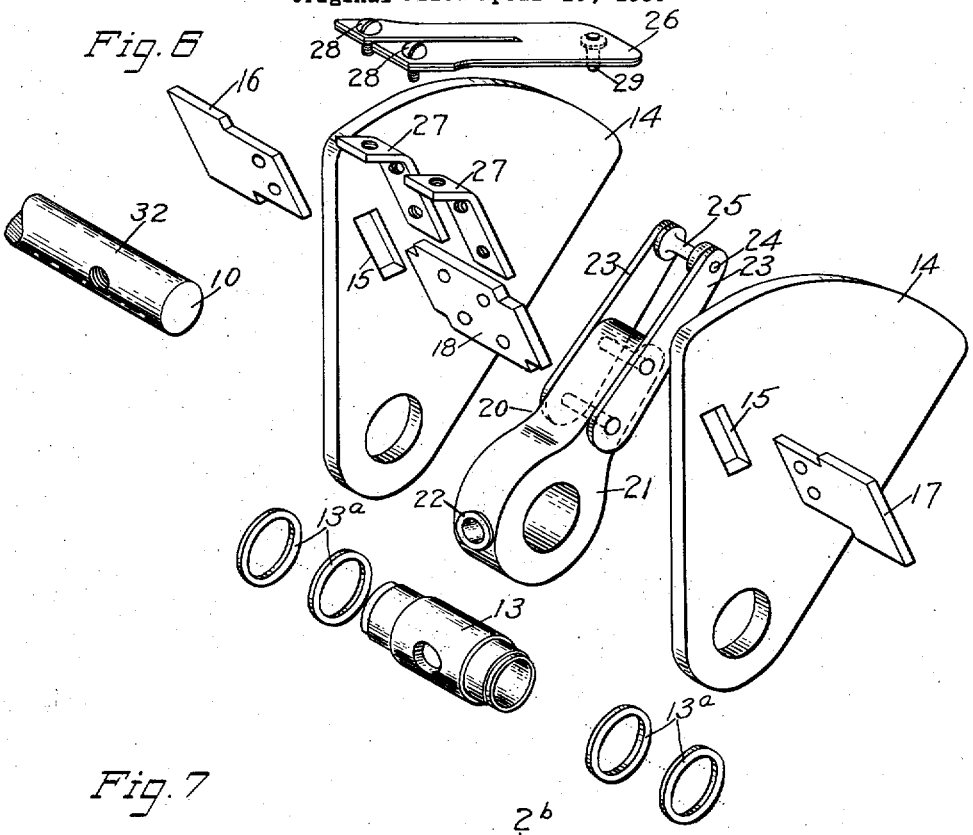
Fig. 6 is an isometric view showing the several parts of one of the detachable electro-responsive circuit-controlling structures.

Carried by the standard 6 is a movable supporting and operating element, and this element is preferably a rotatable shaft 10 supported in bushings 11, 11 projecting laterally from the side plates 7, 7. For moving the shaft 10 there is provided an operating means, which may include a handle 12 pivoted between the side plates 7, 7 and operatively connected with the shaft 10 in a manner to be presently described in detail. The shaft 10 serves as the means for supporting and moving one or more electro-responsive circuit-controlling mechanisms, two such mechanisms being shown in the drawings at opposite ends of the shaft. In accordance with one phase of the invention, each of these circuit-controlling mechanisms is a separate self-contained structure readily detachable from the shaft 10. One of these self-contained structures will now be described in detail, the separate parts thereof being shown in Fig. 6 and a right side view being shown in Fig. 7.

Each circuit-controlling structure includes an element 13 in the form of a sleeve adapted to fit over the end of the shaft 10 as shown in Fig. 5. Rotatably mounted on the sleeve 13 is a contact member which includes two spaced side plates preferably formed of insulating material. The plates of the right hand member are indicated at 14, 14, and those of the left hand member are indicated at $14^a$, $14^a$. The sleeve 13 is reduced in diameter and shouldered at its ends to receive the plates, and washers $13^a$, $13^a$ may be provided at each side of each plate. After assembly the ends of the sleeve are turned or spun outward, as shown in Fig. 5, in order to hold the washers and plates in place.

Two laterally projecting movable contacts 16 and 17 are carried by the contact member at the sides thereof, these contacts projecting laterally from the respective side plates 14, 14 and being adapted to be engaged with and disengaged from the respective stationary contacts 4 and 5 which have already been described. The said contacts 16 and 17 are in the form of metallic plates which project inward through slots 15, 15 in the respective side plates 14, 14. Extending transversely between the two side plates is an insulating bar 18, the ends of which also extend into the said slots 15, 15. The inner ends of the contacts engage the bar 18 at the rear face thereof and are held in place by means of screws 19, 19.

There is provided as a part of the movable self-contained structure an actuator 20 serving as the immediate means for moving or actuating the contact member for normal switching purposes or to effect closing of the circuit after automatic opening thereof. The actuator 20 is pivotally movably mounted for movement about the same axis as the contact member, and in the present instance the actuator is rigidly secured to the sleeve 13 so as to be movable about the axis of the shaft when the bushing and shaft are turned. As shown the actuator comprises an insulating element 21 mounted on the sleeve 13 between the plates 14, 14. The element 21 may have a drive fit on the sleeve, or it may be retained thereon by a small radial bushing 22 extending through registering holes. The actuator also comprises two spaced arms 23, 23 secured to the element 21 and carrying at their outer ends a small roller 25 rotatable on integral trunnions 24.

As a part of the movable self-contained structure I also provide an electro-responsively controlled means including a normally operative mechanical connection between the actuator and the contact member which connection is operative to enable the actuator to operate the contact member to open and close the circuit for ordinary switching purposes and which is automatically released upon the attainment of abnormal current conditions so as to permit the contact member to automatically move independently of the actuator to its open-circuit position. The electro-responsively controlled means may be widely varied in construction, but I prefer and have shown an electro-thermally responsive bi-metallic strip which is adapted to be deflected by reason of the heating action of excess current therein in accordance with the wellknown action of such bi-metallic strips. The bi-metallic strip is shown in the drawings at 26, this strip being substantially U-shaped and having the legs of the U connected respectively with the movable contacts 16 and 17. As illustrated there are connecting elements 27, 27 engaged and held in place by the said screws 19, 19, and the end portions of the legs of the strip 26 are provided with holes through which extend screws 28, 28 which detachably hold the strip in place on the connecting elements 27, 27. It will be observed that the strip 26 provides an electrical connection between the two movable contacts 16 and 17, thus completing the circuit through the entire mechanism when the movable contacts 16 and 17 are in engagement with the stationary contacts 4 and 5.

The strip 26 is so shaped and positioned that it serves in and of itself as a latch to hold the contact member and the actuator in normally fixed relationship with each other. For this purpose the strip 26 is provided with a pin 29 adapted to engage the roller 25. Under normal conditions the strip 26 serves to mechanically connect the contact member and the actuator 20 so that normal switching movements may be effected, but when the bi-metallic strip is heated by reason of the passage of excess current therethrough it is deflected upward and rearward so as to cause the pin 29 to disengage the roller 25 of the actuator 20 and permit the contact member to move automatically in the counter-clockwise direction so as to separate the contacts 16 and 17 from the contacts 4 and 5 and thus break the circuit at two places.

The contact member of each self-contained structure is biased for movement in the circuit-opening direction, in this case in the counter-clockwise direction, by means of a spring 30, surrounding the corresponding bushing 11. The spring is engaged at one end with the corresponding side plate 7 and at the other end with the inner one of the two spaced side plates 14, 14.

As already stated the self-contained structure that has been described, is readily detachable from its supporting and operating element, that is, the shaft 10. To facilitate detachment the structure is held in place by a screw 31 extending through the bushing 22 and into a threaded hole 32 in the shaft. It will be apparent that after disengaging the spring 30 and removing the screw 31 the entire structure may be entirely removed as indicated at the right in Fig. 5, thus facilitating adjustments, repairs or replacement.

In accordance with one phase of the invention there are provided two or more circuit breaker mechanisms all arranged to be operated or controlled in a novel manner by means of a single operating member such as the handle 12. As concerns this phase of the invention it is not necessary that the circuit breaker mechanisms themselves be constructed in detail as described or that they include self-contained detachable structures.

Figure 8:
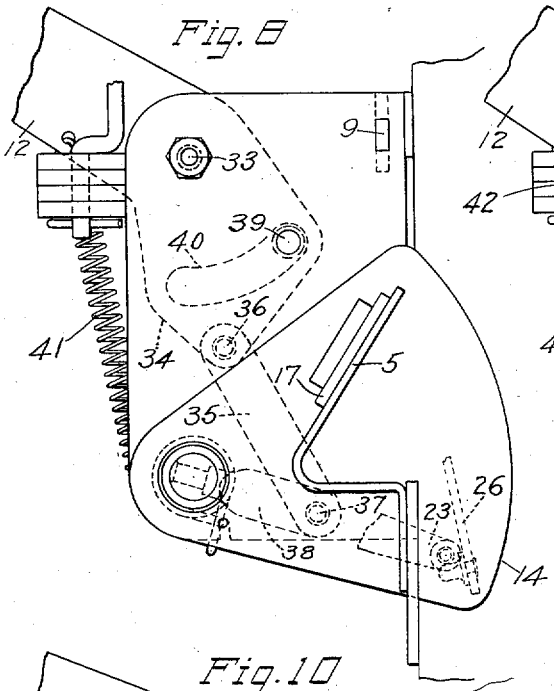
Fig. 8 is a fragmentary side view, partly diagrammatic, showing the movable parts in their normal closed-circuit positions.

When there are two or more mechanisms the several actuators 20, 20 are connected together for movement in unison, in this case all of them being connected with the common operating shaft 10. For purposes of convenience the operating shaft 10 and the actuators carried thereby will be referred to collectively as the actuating member. In the present instance the operating means for the actuating member is carried by the standard 6 and is located between the two circuit breaker mechanisms. This arrangement is desirable, but is not essential as concerns the broader aspects of the invention. The said operating means has already been referred to as preferably including the handle 12. As shown in Figs. 4, 5 and 8, the handle 12 is pivotally mounted on a pin 33 extending transversely between the side plates 7, 7 of the standard. As shown the handle comprises a single piece of sheet metal which is extended at its inner end as shown at 34. A link 35 is pivotally connected at 36 with the extension 34 of the handle and is pivotally connected at 37 with an arm 38 projecting radially from the shaft 10. A suitable means is provided for limiting the movement of the handle and there is shown for this purpose a transverse pin 39 extending through an arcuate slot 40 in the handle extension 34. It will be evident that movement of the handle 12 may be transmitted through the link 35 and the arm 38 to turn the actuating member and thus operate the contact members.

As already pointed out the contact members are biased for movement in the opening direction, that is, in the counter-clockwise or opening direction by means of the springs 30, 30. The said contact members are additionally urged in the opening direction by means of the resiliency of the stationary contacts 4 and 5. When the actuating member is in its closed-circuit position as shown in Fig. 8 the two toggle links 34 and 35 occupy the positions shown with the pivotal axis at 36 in front of a straight line connecting the pivotal axes at 33 and 37. Movement of the links toward the front is prevented by the stop pin 39 and thus the two links 34 and 35 constitute a restraining means positively resisting the tendency of the contact members to automatically move in the counter-clockwise or opening direction.

Provision is made whereby each electro-responsive means serves upon the passage of excess current not only to release its own contact member for movement independently of the actuating member but also releases the restraining means to permit the actuating member and the remaining contact members to also move to their open-circuit positions. The action of the electro-responsive means upon the restraining means will depend upon the type of restraining means selected, but when the restraining means comprises toggle links as shown I preferably provide means which bias the said links for movement out of their locking position. As shown this means is a spring 41 which tends to move the handle 12 in the counter-clockwise direction and therefore tends to move the links 34 and 35 in the direction to break the toggle. I have already pointed out that the links are held in their locking position by reason of the pressure exerted on the actuating members by the two springs 30, 30 acting through the contact members and the thermal strips 26, 26. Obviously this pressure must be so related to the tension of the spring 41 that it will normally overcome the tendency of the said spring to move the links out of their locking position.

Figure 11:
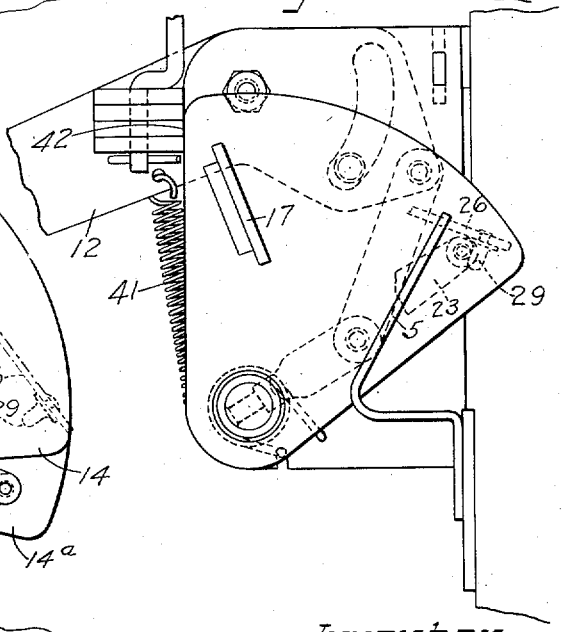

Fig. 8 shows the circuit breaker with all of the parts in closed-circuit positions, the toggle links 34 and 35 serving as restraining means to prevent the movement of any of the parts to their open-circuit positions. By means of the handle 12 the actuating member and all of the contact members can be moved, while remaining in fixed relationship to each other, to their open-circuit positions as shown in Fig. 11. It will be understood that during such movement the thermal strips 26, 26 remain in engagement with the respective actuators 20, 20, and that thus the handle 12 can be used to operate the circuit breaker as a switch to open and close the circuit for ordinary switching purposes. During such operation the contact members are positively moved in the clockwise circuit-closing direction by reason of the engagement of the thermal strips 26, 26 with the actuators 20, 20 and the said contact members are moved in the counter-clockwise circuit-opening direction by the spring 30, 30 acting under the control of the actuators and the handle. The counter-clockwise movement of each contact member is limited by a stop 42 carried by the corresponding block 2. The stop comprises a metal strap $42^a$ held in place by the screws $2^a$, $2^a$, and also comprises small blocks $42^b$, $42^b$ of insulating material having holes therein through which the strap 42 extends to support the blocks. The blocks are retained in place by means of a cotter pin $42^c$.

As already pointed out each thermal strip 26 is so constructed and adjusted that upon the attainment of abnormal current conditions, as for instance upon passage of a current in excess of a predetermined amount, it will be deflected upward and rearward. When the current in the strip exceeds the said predetermined amount the strip will disengage the actuator 20, thus breaking the mechanical connection between the actuator and the contact member. As soon as this mechanical connection is broken the contact member is immediately turned in the counter-clockwise direction under the action of the corresponding spring 30 to the open-circuit position, the circuit being thus broken in two places as already described.

Figure 9:
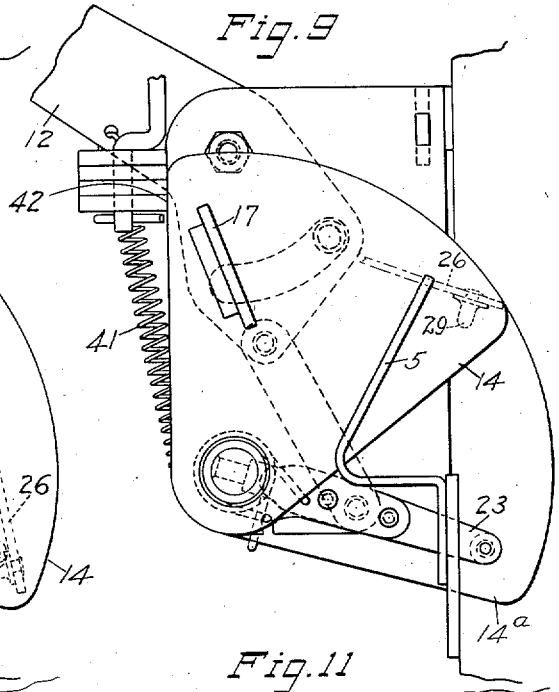
Figs. 9, 10 and 11 are views, similar to Fig. 8, but showing the mechanism of the circuit breaker in various other positions.

It will be understood that the automatic movement of either contact member to its open-circuit position takes place entirely independently of the actuating member and will so take place even though the actuating member be positively held in its closed-circuit position. Fig. 9 shows one contact member, that is, the right hand contact member, as having automatically moved to its open-circuit position, it being assumed that the handle 12 has been held in its closed-circuit position. Thus it is impossible for anyone to prevent the operation of any one of the circuit breaker mechanisms by holding or fastening the handle in its closed-circuit position.

As already stated, the spring 41 is of such strength as to be insufficient to break the toggle at 34, 35 when all of the contact members are biased in the opening direction by reason of the action of the springs 30, 30 and of the resilient contacts 4, 4 and 5, 5. However when either of the thermal strips 26, 26 acts to disengage the actuating member and release the corresponding contact member, the pressure upon the toggle links is reduced. The strength of the spring 41 is such that, upon the reduction of pressure resulting from the electro-responsive release of any one contact member, it immediately acts to move the actuating member and each remaining contact member to their open-circuit positions.

Figure 10:
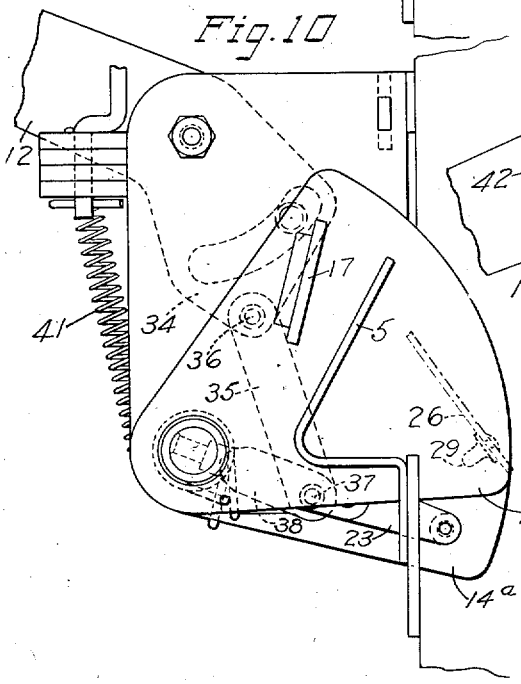

Fig. 10 shows the right hand contact member as having been released and as having started its automatic movement in the opening direction. The release of this right hand contact member has reduced the pressure on the toggle links 34, 35 sufficiently to permit the spring 41 to act, and the spring has already started the movement of the entire operating mechanism and of the remaining left hand contact member toward their open-circuit positions. This movement continues with the right hand contact member slightly in advance of the left hand contact member until the full open positions are reached as shown in Fig. 11, wherein the contact members are in their full open-circuit positions as limited by the stops 42. The mechanical connection between the released right hand contact member and the corresponding actuator 20 is automatically restored as the open-circuit position is reached, by reason of the re-engagement of the thermal strip 26 with the roller 25 of the actuator. Thus the complete normal relationship of the parts is re-established and the circuit can be reclosed if desired by merely moving the handle to its close-circuit position. It will be clear however that if the excess current condition still prevails upon attempted reclosure of the circuit, one or both of the thermal strips will again act to cause the immediate reopening of the circuit.

Figure 7:
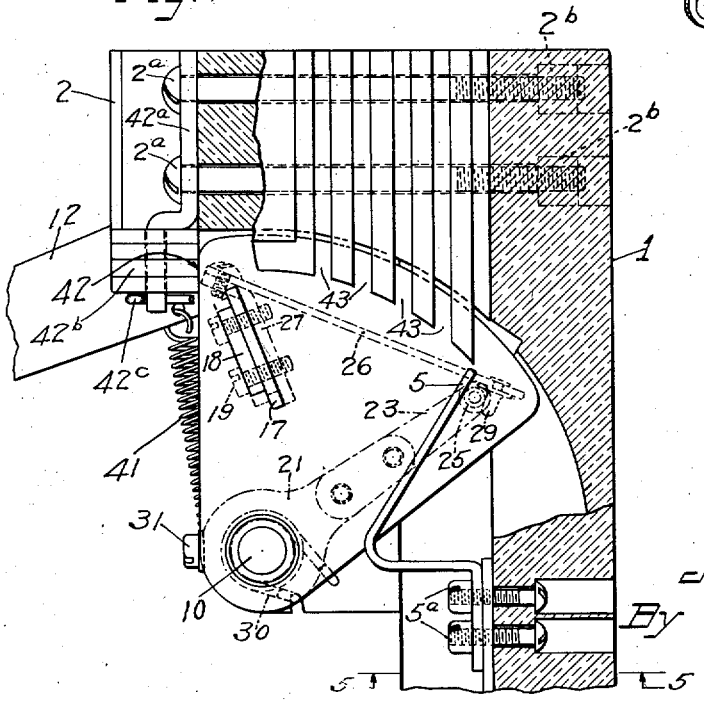
Fig. 7 is a fragmentary side view showing various parts of the circuit breaker in assembled relationship, the base being shown partly in section along the line 7—7 of Fig. 5.

I preferably make special provision for minimizing arcing between the stationary and movable contacts upon the breaking of the circuit. In my before-mentioned Patent No. 1,812,842 I have disclosed two insulating walls at opposite sides of the path of movement of each movable contact, these walls serving to confine any gases that may be formed as the result of arcing and to thus minimize arcing manifestations. In accordance with the present invention I provide adjacent each pair of contacts not only the two opposite walls (the outer surface of the plate 14 or 14ª as shown in Figs. 4 and 5 and the adjacent parallel oppositely facing surfaces of the insulating base 1 and the cover 3), but also a third wall (the surface of the block 2 in which are formed the slots 43, 43 as shown in Fig. 7), which third wall extends transversely between the first said walls. As shown the wall at the third side is arcuate so as to conform approximately to the arcuate path of movement of the movable contact. These three walls constitute insulating means associated with the contacts and closely adjacent three sides of the path of circuit-opening movement of each movable contact. The said three walls serve to much more effectively confine the arc-formed gases than can be done with only two walls, as disclosed in my said Patent No. 1,812,842.

It will be observed that each plate 14 or 14ª constitutes a shield between the bi-metallic thermal latch 26 and the rupturing position of the corresponding contacts, thus effectively protecting the said latch from any arcing manifestations.

In order to still further minimize arcing I preferably provide means embodying the principles set forth in my Patent No. 1,554,528 dated September 22, 1925. The insulating block 2 is provided at both sides with slots or vents 43, 43, in order to form two series of chambers in close proximity to the respective paths of movement of the movable contacts, these chambers being adapted for receiving and condensing arc-formed gases. The inner ends of the slots 43, 43 are shown as being at the before-mentioned curved surfaces or walls which conform to the arcuate paths of the movable contacts, but as to this detail I do not limit myself. It will be obvious that when the circuit is broken by the movement of the contacts 16 and 17 from the closed position to the position shown by full lines in Fig. 7, the gases resulting from any arcs that may be formed will pass upward into the slots 43, 43, being thus cooled and dissipated so as to prevent the continuation of the arcing action. It will be observed that the slots 43 constitute vents for the arc-formed gases, these vents communicating with the arcing zones of the respective pairs of contacts and extending to the exterior of the insulating means consisting of the insulating members 1, 2 and 3. The vents are shown as being straight, but as to this I do not limit myself. Preferably and as shown the vents for each pair of contacts terminate at an end portion of the said insulating means, and preferably all of the vents terminate at the same end portion.

For the attachment of circuit wires, terminals 44, 44 and 45, 45 may be secured to the base 1 by means of nuts on screws 46, 46 and 47, 47 and they are connected electrically with the respective stationary contacts 4, 4 and 5, 5. The terminals 44, 44 may be regarded as adapted for a connection of service wires S, S and the terminals 45, 45 may be regarded as adapted for the connection of load wires L, L. For a three wire circuit there may be additional terminals 48 and 49 adapted for the connection of additional service and load wires forming the third or neutral connection.

The two screws 46 and 47 are so spaced as to be adapted to receive a by-pass link A shown by dot-and-dash lines in Fig. 1, this link being held in place by nuts on the said screws. It will be obvious that when the link A is in place, current can flow directly from the service wire terminal to the load wire terminal independently of the circuit breaker mechanism. As already described parts of the circuit breaker mechanism are removable, and with the current by-passed as described the said parts of the circuit breaker mechanism can be removed for adjustment, repair or replacement without interrupting the electrical connection between the service and load wires.

Figure 3:
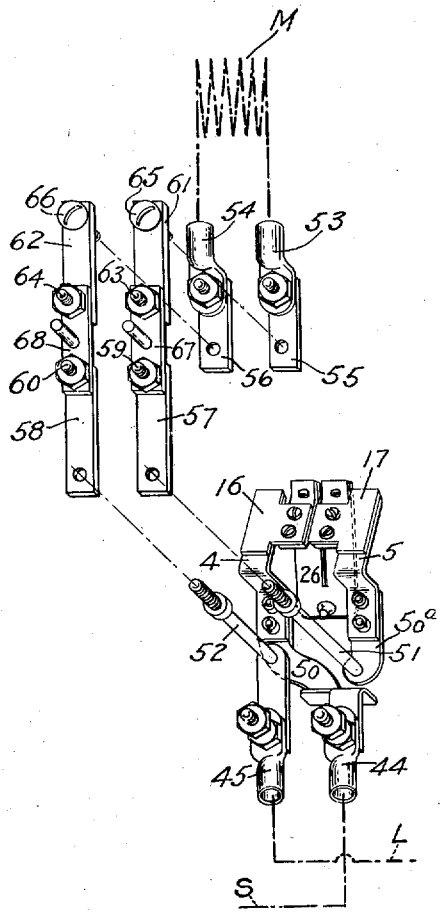
Fig. 3 is a perspective view showing the conducting parts at one side of the appliance.

If the circuit breaker is to be used independently of an electric meter, the terminals 44 and 45 of each pair may be connected directly with the corresponding stationary contacts 4 and 5. However, when the appliance is intended for use in conjunction with an electric meter such as M and when the complete device is required to include meter testing facilities I prefer to provide the electrical connections which will now be described, reference being had particularly to Figs. 1 and 3.

Each stationary contact 4 is connected by means of the offset conductor member 50 with the corresponding wire terminal 44 and the companion stationary contact 5 is connected through a conductor 50ª with a threaded rod 51 which is positioned to extend directly forward through a hole in the front of the corresponding cover 3. The other wire terminal 45 is connected with a threaded rod 52 similar to the rod 51 and similarly extending through a hole in the front of the cover. Wire terminals 53 and 54 are mounted on the front of the block 2, being adapted to be connected respectively with the service and load sides of the meter. The terminals 53 and 54 are electrically connected respectively with vertical straps 55 and 56, having threaded holes near the lower ends thereof.

On the front of each removable cover 3 I provide conductors which serve when the cover is in place to provide electrical connection between the rods 51 and 52 and the straps 55 and 56. The rods 51 and 52 extend through and are electrically connected with vertical straps 57 and 58 mounted on the cover, the rods preferably having integral collars thereon which directly engage the rear surfaces of the straps. The straps 57 and 58 are held in place by screws 59 and 60. Nuts on the rods 51 and 52 engage the straps 57 and 58 to provide firm electrical connections and also serve to assist in holding the cover in place. Also mounted on the cover in alignment with the vertical straps 57 and 58 are other vertical straps 61 and 62 held in place by screws 63 and 64. The upper ends of the straps 61 and 62 normally overlap the straps 55 and 56 and are detachably connected thereto by means of screws 65 and 66 entering the threaded holes therein. The straps 57 and 58 are spaced from the straps 61 and 62 but they are normally electrically connected therewith by means of removable test links 67 and 68 normally held in place by means of nuts engaging the screws 59, 60 and 63, 64. From an inspection of Figs. 1 and 3 it will be evident that when the circuit breaker mechanism is in closed position a circuit is established from the service wire terminal 44 through the conductor 50 and through the stationary and movable contacts of the circuit breaker proper to the rod 51. From the rod 51 the circuit extends through the parts 57, 67, 61, 55 and 53 to the meter. From the meter the circuit extends through the parts 54, 56, 62, 68 and 58 to the rod 52, this rod being electrically connected with the load wire terminal 45.

The conductors and links at the front of the cover 3 will be recognized as constituting testing facilities of a well known type. By putting in place a by-pass link between the screws 51 and 52 as indicated by dot-and-dash lines at B in Fig. 1, the current can be by-passed from the service wire to the load wire without going through the meter. It will be observed however that the by-passing between the screws 51 and 52 leaves the circuit breaker in the circuit, thus providing protection for the customer during testing and making it possible to manually control the customer's circuit during testing if desired. One or the other or both of the meter terminals may be freed for testing by removing one or the other or both of the links 67 and 68 in accordance with well known practice.

The mounting of the test links and associated conductors directly upon the cover 3 constitutes an important feature of the invention. It is necessary, or at least highly desirable, to completely enclose the circuit breaker mechanism to prevent tampering therewith, the cover 3 being provided for this purpose. By utilizing the cover 3 not only to protect the circuit breaker mechanism, but also to support the test links, I provide not only a considerable economy of space, but also a considerable economy of material and I substantially reduce the cost of manufacture. Without this arrangement the test links and their associated conductors would have to be located either at the side of the circuit breaker proper or at the top or at the bottom thereof, thus making necessary a very much larger enclosing box.

For enclosing the entire appliance I have shown a cabinet 69 of sheet metal having a rear wall 70, side walls 71 and 72 and end walls 73 and 74. The upper end wall 74 preferably has an opening therein which adapts the cabinet for direct relationship with the electric meter M. The cabinet has an openable front cover 75 which is shown as being hinged at 76, 76 to the bottom end wall 73 and which is normally held closed by a latch at 77. The cover has a slot 78 therein through which the operating handle 12 extends.

I do not herein claim the features of invention involving the relationship between the circuit breaker mechanism proper and the by-passing and meter testing facilities, as these features are disclosed and claimed in my patent for Electric meter service appliance No. 1,840,979 dated January 12, 1932.

What I claim is:

1. A self-contained detachable electro-responsive circuit controlling structure for an automatic circuit breaker comprising in combination, an element detachably connectible with a movable supporting and operating means, an actuator rigidly connected with the said element, a contact member relatively movably carried by the said element and normally connected with the actuator so as to be moved thereby to open and close the circuit, a contact on the contact member adapted to engage and disengage a stationary contact, and an electro-responsive device normally movable with the said actuator and contact member and electrically connected in the circuit to be controlled and with the contact on the contact member so as to automatically serve upon the passage of excess current to release the contact member from the actuator and thus permit the said member to automatically move in the circuit-opening direction independently of the actuator.

2. A circuit controlling structure as set forth in claim 1, wherein the electro-responsive device is an electro-thermally responsive metallic strip serving in and of itself as an automatically releasable latch to normally connect the contact member with the actuator.

3. An automatic circuit breaker comprising in combination, two stationary contacts, a movable operating and supporting means, an element detachably connected with the said supporting and operating means, an actuator rigidly connected with the said element, a contact member relatively movably carried by the said element and normally releasably connected with the actuator so as to be moved thereby, two contacts on the contact member adapted to engage and disengage the stationary contacts to open and close the circuit, and an electro-responsive device normally movable with the said actuator and contact member and electrically connected between the contact on the contact member so as to automatically serve upon the passage of excess current to release the contact member from the actuator and thus permit the said member to automatically move in the circuit-opening direction independently of the actuator.

4. An automatic circuit breaker comprising in combination, a pivotally movable actuator, a contact member pivoted coaxially with the actuator and biased for opening movement independently thereof, a stationary electric contact, a movable electric contact on the contact member engageable with the stationary contact, an electro-responsively controlled mechanical connection between the actuator and the contact member normally enabling the former to move the latter to engage and disengage the said contacts, the said mechanical connection being automatically releasable upon the attainment of abnormal current conditions to permit automatic opening movement of the contact member, and stationary means providing a series of slots having their ends located closely adjacent the path of movement of the movable contact so as to serve to break up any arcs that may be formed.

5. An automatic circuit breaker comprising in combination, a pivotally movable actuator, a contact member pivoted coaxially with the actuator and biased for opening movement independently thereof, two stationary electric contacts at the respective sides of the contact member, two movable electric contacts on the contact member at the sides thereof engageable respectively with the stationary contacts, an electro-responsively controlled mechanical connection between the actuator and the contact member normally enabling the former to move the latter to engage and disengage the said contacts, the said mechanical connection being automatically releasable upon the attainment of abnormal current conditions to permit automatic opening movement of the contact member, and stationary means providing two series of slots having their ends located closely adjacent the respective paths of movement of the movable contacts so as to serve to break up any arcs that may be formed.

6. In a multiple poled automatic circuit breaker, the combination of a movable actuating member, a plurality of independently movable circuit breaker contact members, each having a contact for breaking one leg of the circuit independently of any other leg and each independently biased toward its open-circuit position, and a plurality of electro-responsive means each comprising an element inherently responsive to abnormal current conditions in one leg of the circuit and constituting at least a part of a mechanical connection between the corresponding actuating and contact members normally operative to prevent independent circuit opening movement of the latter, each said element upon the attainment of an abnormal current condition in the corresponding leg of the circuit being relatively movable by reason of its own inherent electro-responsive characteristics so as to render the corresponding mechanical connection ineffective and to thereby permit the corresponding contact member to move to its open-circuit position independently of the actuating member and independently of each other contact member.

7. A multiple poled automatic circuit breaker as set forth in claim 6, wherein each electro-responsively movable element is a latch carried by one of the corresponding contact and actuating members and normally having a direct engagement with the other, the said latch being automatically disengaged from the said other member upon the attainment of an abnormal circuit condition so as to permit independent movement of the contact member.

8. In a multiple poled automatic circuit breaker, the combination of a movable actuating member, a plurality of independently movable circuit-breaker contact members, each having a contact for breaking one leg of the circuit independently of any other leg and each independently biased toward its open-circuit position, and a plurality of electro-responsive means bodily movable with the actuating member and contact members and respectively including mechanical connections normally operative to enable the actuating member to move all of the contact members in unison to open or close the circuit, each mechanical connection being automatically releasable upon the attainment of abnormal current conditions in the corresponding leg to permit automatic opening movement of the corresponding contact member independently of the actuating member and independently of any other contact member.

9. In a multiple poled automatic circuit breaker, the combination of a movable actuating member, a plurality of independently movable circuit-breaker contact members, each having contacts for breaking one leg of the circuit independently of any other leg and each independently biased toward its open-circuit position, a plurality of electro-responsive means bodily movable with the actuating member and contact members and respectively including mechanical connections normally operative to enable the actuating member to move all of the contact members in unison to open or close the circuit, each mechanical connection being automatically releasable upon the attainment of abnormal current conditions in the corresponding leg to permit automatic opening movement of the corresponding contact member independently of the actuating member and independently of any other contact member, a movable operating means, and means connected between the operating means and the actuating member enabling the former to operate the latter, the said means also serving to releasably hold the actuating member in its closed-circuit position.

10. In a multiple poled automatic circuit breaker, the combination of a shaft rotatably supported between its ends, two actuators secured to the respective projecting end portions of the shaft, two independently movable circuit breaker contact members on the said end portions of the shaft adjacent the respective actuators, each having a contact for breaking one leg of the circuit independently of any other leg and each independently biased toward its open-circuit position, and a plurality of electro-responsive means bodily movable with the actuators and contact members and respectively including mechanical connections normally operative to enable the shaft and actuators to move all of the contact members in unison to open or close the circuit, each mechanical connection being automatically releasable upon the attainment of abnormal current conditions in the corresponding leg to permit automatic opening movement of the corresponding contact member independently of the actuating member and independently of any other contact member.

11. In an automatic circuit breaker, the combination of a movable operating means biased for movement in the circuit opening direction, a plurality of independently movable circuit breaker contact members, a plurality of electro-responsively controlled means respectively including mechanical connections normally operative to enable the operating means to move all of the contact members in unison to open or close the circuit, each mechanical connection being automatically releasable upon the attainment of abnormal current conditions to permit automatic opening movement of the corresponding contact member independently of the operating means and independently of any other contact member, and a restraining means separate from the said contact members and mechanical connections for releasably holding the operating means in its closed-circuit position so long as all of the contact members are in their closed positions, the said restraining means upon the electro-responsive release of any one contact member being automatically released to permit immediate movement in the opening direction of the operating means and of each remaining contact member.

12. In an automatic circuit breaker, the combination of a movable actuating member biased toward its open-circuit position, a plurality of independently movable circuit breaker contact members each normally connected with the actuating member for movement therewith to open and close the circuit, a plurality of electro-responsive devices associated with the respective contact members and each serving upon the attainment of abnormal current conditions to release its contact member so as to permit automatic opening movement thereof independently of the actuating member and independently of any other contact member, and a means for releasably holding the actuating member in its closed-circuit position so long as all of the contact members are in their closed positions, the said means upon the electro-responsive release of any one contact member being automatically released to permit immediate movement in the opening direction of the actuating member and of each remaining contact member.

13. In an automatic breaker, the combination of a movable operating means biased for movement in the circuit opening direction, a movable actuating member connected with the operating means to be operated thereby, a plurality of independently movable circuit breaker contact members each normally connected with the actuating member for movement therewith to open and close the circuit, a plurality of electro-responsive devices associated with the respective contact members and each serving upon the attainment of abnormal current conditions to release its contact member so as to permit automatic opening movement thereof independently of the actuating member and independently of any other contact member, and a means for releasably holding the operating means and actuating member in their closed-circuit positions so long as all of the contact members are in their closed positions, the said means upon the electro-responsive release of any one contact member being automatically released to permit immediate movement in the opening direction of the operating means and actuating member and of each remaining contact member.

14. An automatic circuit breaker as set forth in claim 13, wherein the actuating member and all of the contact members are pivotally movable about a common axis.

15. An automatic circuit breaker as set forth in claim 13, wherein each electro-responsive means is normally bodily movable with its corresponding contact member.

16. In an automatic circuit breaker, the combination of a movable operating means biased for movement in the circuit opening direction, a plurality of movable circuit breaker contact members each biased for opening movement independently of the operating means and independently of any other contact member, a plurality of electro-responsively controlled means respectively including mechanical connections normally operative to enable the operating means to move all of the contact members in unison to open or close the circuit, each mechanical connection being automatically releasable upon the attainment of abnormal current conditions to permit independent automatic opening movement of the corresponding contact member, and releasable means normally operative for holding the operating means in its closed-circuit position so long as the tendency thereof to move to its open-circuit position is resisted by all of the contact members as the result of the normal bias thereof, the said means, upon the reduction of the said pressure as the result of the electro-responsive release of any one contact member, being rendered ineffective so as to permit immediate movement in the opening direction of the operating means and of each remaining contact member.

17. An automatic circuit breaker as set forth in claim 16, wherein there is a spring tending to render the releasable holding means inoperative, and wherein the pressure exerted by all of the contact members is sufficient to prevent action of the spring and the pressure exerted by one less than all of the contact members is insufficient to prevent action of the spring.

18. An automatic circuit breaker as set forth in claim 16, wherein the releasable holding means is separate from the said contact members and mechanical connections.

19. An automatic circuit breaker as set forth in claim 16, wherein each mechanical connection after automatic release thereof is automatically restored to its operative condition as the result of the automatic movement of the operating means to its open-circuit position.

20. In an automatic circuit breaker, the combination of a movable actuating member biased toward its open-circuit position, a plurality of independently movable circuit breaker contact members each normally connected with the actuating member for movement in fixed relation therewith to open and close the circuit, a plurality of electro-responsive means associated with the respective contact members and each serving upon the attainment of abnormal current conditions to release its contact member so as to permit automatic opening movement thereof independently of the actuating member and independently of any other contact member, and releasable means normally operative for holding the actuating member in its closed-circuit position so long as pressure is exerted on the actuating member by all of the contact members as the result of the normal bias thereof, the said holding means, upon the reduction of the said pressure as the result of the electro-responsive release of any one contact member, being rendered ineffective so as to permit immediate movement in unison in the opening direction of the actuating member and of each remaining contact member.

21. An automatic circuit breaker as set forth in claim 20, wherein each electro-responsive means is a bodily movable electro-thermally responsive metallic strip serving in and of itself as an automatically releasable latch to normally connect the corresponding contact member with the actuating member.

22. In an automatic circuit breaker, the combination of a movable actuating member biased toward its open-circuit position, a plurality of independently movable circuit breaker contact members, a plurality of electro-responsive means respectively including mechanical connections normally operative to enable the actuating member to move all of the contact members in unison to open or close the circuit, each mechanical connection being automatically releasable upon the attainment of abnormal current conditions to permit automatic opening movement of the corresponding contact member independently of the actuating member and independently of any other contact member, and means including toggle links for operating the actuating member, the said toggle links being in their locking relationship when the actuating member is in its closed-circuit position and being automatically moved out of the said locking relationship upon the electro-responsive release of any one contact member to thereby permit immediate movement in the opening direction of the operating means and of each remaining contact member.

23. In an automatic circuit breaker, the combination of a movable actuating member, a plurality of independently movable circuit breaker contact members each normally connected with the actuating member to be moved thereby to open and close the circuit, a plurality of electro-responsive devices associated with the respective contact members and each serving upon the attainment of abnormal current conditions to release its contact member so as to permit automatic opening movement thereof independently of the actuating member and independently of any other contact member, means including toggle links for operating the actuating member, the said toggle links being in their locking relationship when the actuating member is in its closed-circuit position and being held in the said relationship by the pressure resulting from the bias of the contact members, and a spring tending to move the toggle links out of their said locking relationship, the said spring being incapable of so moving the links when pressure is exerted on the actuating member by all of the contact members and being capable of so moving them when pressure is exerted by one less than all of the contact members.

24. The combination in an automatic circuit breaker, of a stationary contact, a movable contact adapted to engage and disengage the stationary contact, the last said contact being biased for movement in the circuit-opening direction and being normally held mechanically against such movement, an electro-responsive element bodily movable with the movable contact and arranged to be energized upon the attainment of an abnormal current condition in the circuit so as to mechanically release the said contact and thus permit it to automatically move to open-circuit position, and insulating means associated with the contacts and comprising walls closely adjacent three sides of the path of movement of the movable contact.

25. The combination in an automatic circuit breaker, of two stationary contacts, two movable electrically connected contacts adapted to engage and disengage the respective stationary contacts, the last said contacts being biased for movement in the circuit-opening direction and being normally held mechanically against such movement, an electro-responsive element bodily movable with the movable contacts and arranged to be energized upon the attainment of an abnormal current condition in the circuit so as to mechanically release the said contacts and thus permit them to automatically move to open-circuit positions, and insulating means associated with the contacts and comprising walls closely adjacent three sides of the path of movement of each movable contact.

26. The combination in an automatic circuit breaker, of two stationary contacts, a movable actuator, two movable contacts adapted to engage and disengage the respective stationary contacts and biased for movement in the circuit-opening direction, a thermally responsive bi-metallic strip bodily movable with the movable contacts and electrically connected between them, the said strip normally serving as a latch to mechanically connect the movable contacts with the actuator and the said strip upon being heated by an abnormal current therein serving to mechanically release the said contacts and thus permit them to automatically move to open-circuit position, and insulating means associated with the contacts and comprising walls closely adjacent three sides of the path of movement of each movable contact.

27. The combination in an automatic circuit breaker, of a stationary contact, a movable contact adapted to engage and disengage the stationary contact, the last said contact being biased for movement in the circuit-opening direction and being normally held mechanically against such movement, an electro-responsive element bodily movable with the movable contact and arranged to be energized upon the attainment of an abnormal current condition in the circuit so as to mechanically release the said contact and thus permit it to automatically move to open-circuit position, and three insulating walls closely adjacent three sides of the path of movement of the said movable contact, at least one of the said walls being stationary and at least one of the said walls being movable with the movable contact.

28. The combination in an automatic circuit breaker, of a stationary contact, a movable contact adapted to engage and disengage the stationary contact, the last said contact being biased for movement in the circuit-opening direction and being normally held mechanically against such movement, an electro-responsive element bodily movable with the movable contact and arranged to be energized upon the attainment of an abnormal current condition in the circuit so as to mechanically release the said contact and thus permit it to automatically move to open-circuit position, stationary insulating means comprising two walls closely adjacent two sides of the path of movement of the movable contact, and an insulating means movable with the movable contacts and comprising a wall adjacent a third side of the path of movement of the movable contact, the said movable insulating means also serving to shield the electro-responsive element from the rupturing position of the contacts.

29. The combination in an automatic circuit breaker, of a stationary contact, a movable actuator, a movable contact adapted to engage and disengage the stationary contact and biased for movement in the circuit-opening direction, the said movable contact being normally mechanically connected with the actuator to be moved thereby, an electro-responsive element bodily movable with the movable contact and with the actuator and arranged to be energized upon the attainment of an abnormal current condition in the circuit so as to mechanically release the movable contact from the actuator, stationary insulating means comprising two walls closely adjacent two sides of the path of movement of the movable contact, and an insulating means movable with the movable contacts and comprising a wall adjacent a third side of the path of movement of the movable contact, the said movable insulating means also serving to shield the said electro-responsive element from the rupturing position of the contacts.

30. The combination in an automatic circuit breaker, of a stationary contact, a movable actuator, a movable contact adapted to engage and disengage the stationary contact and biased for movement in the circuit-opening direction, a thermally responsive bi-metallic strip bodily movable with the movable contact and electrically connected in the circuit, the said strip normally serving as a latch to mechanically connect the movable contact with the actuator and the said strip upon being heated by an abnormal current therein serving to mechanically release the said contact and thus permit it to automatically move to open-circuit position, stationary insulating means comprising two walls closely adjacent two sides of the path of movement of the movable contact, and an insulating means movable with the movable contacts and comprising a wall adjacent a third side of the path of movement of the movable contact, the said movable insulating means also serving to shield the said bi-metallic strip from the rupturing position of the contacts.

31. The combination in an automatic circuit breaker, of two stationary contacts, a movable actuator, two movable contacts adapted to engage and disengage the respective stationary contacts and biased for movement in the circuit-opening direction, a thermally responsive bi-metallic strip bodily movable with the movable contacts and electrically connected between them, the said strip normally serving as a latch to mechanically connect the movable contacts with the actuator and the said strip upon being heated by an abnormal current therein serving to mechanically release the said contacts and thus permit them to automatically move to open-circuit position, stationary insulating means comprising two walls closely adjacent two sides of the path of movement of each movable contact, and an insulating means movable with the movable contacts and comprising walls adjacent a third side of the path of movement of each movable contact, the said movable insulating means also serving to shield the said bi-metallic strip from the rupturing positions of the contact.

32. The combination in an automatic circuit breaker, of a stationary contact, a movable contact adapted to engage and disengage the stationary contact, the last said contact being biased for movement in the circuit-opening direction and being normally held mechanically against such movement, an electro-responsive element bodily movable with the movable contact and arranged to be energized upon the attainment of an abnormal current condition in the circuit so as to mechanically release the said contact and thus permit it to automatically move to open-circuit position, and insulating means associated with the contacts and comprising walls closely adjacent three sides of the path of movement of the movable contact, the said insulating means having therein a slot adjacent the path of movement of the movable contact.

33. The combination in an automatic circuit breaker, of a stationary contact, a movable contact adapted to engage and disengage the stationary contact, the last said contact being biased for movement in the circuit-opening direction and being normally held mechanically against such movement, an electro-responsive element arranged to be energized upon the attainment of an abnormal current condition in the circuit so as to mechanically release the said contact and thus permit it to automatically move to open-circuit position, and stationary insulating means substantially completely enclosing the contacts and comprising walls closely adjacent the path of movement of the movable contact, the said insulating means having therein a vent communicating with the arcing zone of the contacts and extending to the exterior of the said insulating means.

34. The combination in an automatic circuit breaker, of two stationary contacts, two movable electrically connected contacts adapted to engage and disengage the stationary contacts, the last said contacts being biased for movement in the circuit-opening direction and being normally held mechanically against such movement, an electro-responsive element arranged to be energized upon the attainment of an abnormal current condition in the circuit so as to mechanically release the said movable contacts and thus permit them to automatically move to open-circuit positions, and stationary insulating means substantially completely enclosing the contacts and including walls closely adjacent the path of movement of each movable contact, the said insulating means having therein two separate vents each communicating with the arcing zone of the corresponding pair of contacts and extending to the exterior of the said insulating means.

35. The combination in an automatic circuit breaker, of two stationary contacts, two movable contacts adapted to engage and disengage the stationary contacts, the last said contacts being biased for movement in the circuit-opening direction and being normally held mechanically against such movement, an electro-responsive element bodily movable with the movable contacts and electrically connected between them to be energized upon the attainment of an abnormal current condition in the circuit so as to mechanically release the said movable contacts and thus permit them to automatically move to open-circuit positions, and stationary insulating means substantially completely enclosing the contacts and including walls closely adjacent the path of movement of each movable contact, the said insulating means having therein two separate vents each communicating with the arcing zone of the corresponding pair of contacts and extending to the exterior of the said insulating means.

36. The combination in an automatic circuit breaker, of two stationary contacts, two movable electrically connected contacts adapted to engage and disengage the stationary contacts, the last said contacts being biased for movement in the circuit-opening direction and being normally held mechanically against such movement, an electro-responsive element arranged to be energized upon the attainment of an abnormal current condition in the circuit so as to mechanically release the said movable contacts and thus permit them to automatically move to open-circuit positions, and stationary insulating means substantially completely enclosing the contacts and comprising walls closely adjacent the path of movement of each movable contact, the said insulating means having therein two separate vents each communicating with the arcing zone of the corresponding pair of contacts and each extending to and terminating at an end portion of the said insulating means.

37. The combination in an automatic circuit breaker, of two stationary contacts, two movable electrically connected contacts adapted to engage and disengage the stationary contacts, the last said contacts being biased for movement in the circuit-opening direction and being normally held mechanically against such movement, an electro-responsive element arranged to be energized upon the attainment of an abnormal current condition in the circuit so as to mechanically release the said movable contacts and thus permit them to automatically move to open-circuit positions, and stationary insulating means substantially completely enclosing the contacts and comprising walls closely adjacent the path of movement of each movable contact, the said insulating means having therein two separate vents each communicating with the arcing zone of the corresponding pair of contacts and extending to and terminating at the same end portion of the said insulating means.

38. In an automatic circuit breaker, the combination of a movable actuating member, a plurality of independently movable contact members each provided with a movable contact, a plurality of stationary contacts associated with the respective movable contacts, a plurality of bodily movable electro-responsive latches normally enabling the actuating member to move all of the contact members in unison, each latch being automatically releasable upon the attainment of abnormal current conditions to permit automatic and independent contact-disengaging movement of the corresponding contact member, and operating means for the actuating member including toggle links which serve in cooperation with the releasable latches and other associated parts to positively force the movable contacts into firm engagement with the stationary contacts and to lock them in such engagement.

39. In an automatic circuit breaker, the combination of a movable actuating member, a plurality of independently movable contact members each provided with a movable contact, a plurality of stationary contacts associated with the respective movable contacts, a plurality of bodily movable current-carrying bi-metallic latches normally enabling the actuating member to move all of the contact members in unison, each latch being automatically releasable upon the attainment of abnormal current conditions to permit automatic and independent contact-disengaging movement of the corresponding contact member, and operating means for the actuating member including toggle links which serve in cooperation with the releasable latches and other associated parts to positively force the movable contacts into firm engagement with the stationary contacts and to lock them in such engagement.

40. In an automatic circuit breaker, the combination of a movable actuating member, a plurality of independently movable contact members each provided with a pair of movable contacts, a plurality of pairs of stationary contacts associated with the respective pairs of movable contacts, a plurality of bodily movable current-carrying bi-metallic latches normally enabling the actuating member to move all of the contact members in unison, each bi-metallic latch being electrically connected between the movable contacts of the corresponding pair and being automatically releasable upon the attainment of abnormal current conditions to permit automatic and independent contact-disengaging movement of the corresponding contact member, and operating means for the actuating member including toggle links which serve in cooperation with the releasable latches and other associated parts to positively force the movable contacts into firm engagement with the stationary contacts and to lock them in such engagement.

In testimony whereof I have hereunto set my hand this 25th day of April, 1933.

JOSEPH SACHS.